(12) United States Patent
Harkness

(10) Patent No.: US 10,102,935 B2
(45) Date of Patent: Oct. 16, 2018

(54) METHOD OF REMOVING UPPER INTERNALS FROM A NUCLEAR REACTOR PRESSURIZED VESSEL

(71) Applicant: Westinghouse Electric Company LLC, Cranberry Township, PA (US)

(72) Inventor: Alexander W. Harkness, Gibsoni, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 552 days.

(21) Appl. No.: 15/066,230

(22) Filed: Mar. 10, 2016

(65) Prior Publication Data

US 2016/0203882 A1    Jul. 14, 2016

Related U.S. Application Data

(62) Division of application No. 13/741,737, filed on Jan. 15, 2013, now Pat. No. 9,318,227.

(51) Int. Cl.
*G21C 19/20* (2006.01)
*G21C 19/02* (2006.01)
(Continued)

(52) U.S. Cl.
CPC ............. *G21C 19/02* (2013.01); *G21C 1/086* (2013.01); *G21C 19/10* (2013.01); *G21C 19/20* (2013.01); *G21C 1/32* (2013.01); *G21C 19/207* (2013.01)

(58) Field of Classification Search
CPC ........ G21C 19/10; G21C 19/20; G21C 19/02; G21C 19/207
(Continued)

(56) References Cited

U.S. PATENT DOCUMENTS 4,778,645 A * 10/1988 Altman ................ G21C 19/207
                                                              376/260
4,830,814 A    5/1989 Altman
(Continued)

FOREIGN PATENT DOCUMENTS

GB    2100496       12/1982
JP    S5554495 A    4/1980
(Continued)

OTHER PUBLICATIONS

Westinghouse Electric Company LLC, EP 13877988.9 Search Report, dated Jul. 22, 2016, 8 pages.

*Primary Examiner* — Jack W Keith
*Assistant Examiner* — Daniel D Wasil
(74) *Attorney, Agent, or Firm* — Joseph C. Spadacene; Westinghouse Electric Company LLC

(57) ABSTRACT

A lifting fixture for removing the upper internals from a nuclear reactor to provide access to the core during a refueling that does not require flooding of a refueling canal. A shield plate is integral to a lifting rig used to remove the upper internals. The shield plate is sized to be supported on the reactor vessel upper flange and to cover the reactor vessel opening with the closure head removed. The shield plate has openings that are in-line with the control rod assembly drive rod travel housings. Control rod assembly drive rods can be accessed through the openings. The lifting rig allows personnel to decouple the drive rods from the rod cluster control assemblies. The lifting fixture enables the decoupled drive rods to be lifted from the core with the upper internals, while shielding maintenance personnel without flooding the area above the reactor.

7 Claims, 11 Drawing Sheets

(51) Int. Cl.
*G21C 19/10* (2006.01)
*G21C 1/08* (2006.01)
*G21C 1/32* (2006.01)

(58) Field of Classification Search
USPC .................. 376/260, 263, 268, 271, 287
See application file for complete search history.

(56) References Cited

U.S. PATENT DOCUMENTS

| | | |
|---|---|---|
| 5,057,270 A | 10/1991 | Chevereau |
| 5,225,150 A | 7/1993 | Malandra et al. |
| 5,412,700 A | 5/1995 | Gillett et al. |
| 5,483,561 A | 1/1996 | Bystrak |
| 6,198,787 B1 | 3/2001 | Hasegawa et al. |
| 8,411,813 B2 | 4/2013 | Aoki |
| 9,206,978 B2 | 12/2015 | Evans et al. |
| 2006/0034414 A1 | 2/2006 | Baliga et al. |
| 2009/0323883 A1* | 12/2009 | Aoki .................. G21C 19/207 376/260 |
| 2013/0287157 A1 | 10/2013 | Conway et al. |
| 2013/0294565 A1 | 11/2013 | Harkness et al. |
| 2013/0336442 A1 | 12/2013 | Evans et al. |

FOREIGN PATENT DOCUMENTS

| | | |
|---|---|---|
| JP | S5885193 A | 5/1983 |
| JP | S61107198 A | 5/1986 |

\* cited by examiner

METHOD OF REMOVING UPPER INTERNALS FROM A NUCLEAR REACTOR PRESSURIZED VESSEL

CROSS REFERENCE TO RELATED APPLICATION

This application is a divisional application of and claims priority to U.S. patent application Ser. No. 13/741,737, filed Jan. 15, 2013 entitled APPARATUS AND METHOD FOR REMOVING THE UPPER INTERNALS FROM A NUCLEAR REACTOR PRESSURIZED VESSEL.

BACKGROUND

1. Field

This invention pertains generally to an apparatus and a method for refueling a nuclear reactor and more particularly to such an apparatus and method for removing and reinstalling the upper internals of such a reactor.

2. Related Art

A pressurized water reactor has a large number of elongated fuel assemblies mounted within an upright reactor vessel. Pressurized coolant is circulated through the fuel assemblies to absorb heat generated by nuclear reactions in fissionable material contained in the fuel assemblies. The primary side of such a nuclear reactor power generating system which is cooled with water under pressure comprises an enclosed circuit which is isolated from and in heat exchange relationship with a secondary circuit for the production of useful energy. The primary side comprises the reactor vessel enclosing a core internal structure that supports the plurality of fuel assemblies containing the fissile material, the primary circuit within heat exchange steam generators, the inner volume of a pressurizer, pumps and pipes for circulating pressurized water; the pipes connecting each of the steam generators and pumps to the reactor vessel independently. In conventional nuclear plants of that type each of the parts of the primary side comprising the steam generator, a pump and a system of pipes which are connected to the reactor vessel form a loop of the primary side.

For the purpose of illustration, FIG. 1 shows a simplified conventional nuclear reactor primary system, including a generally cylindrical pressure vessel 10 having a closure head 12 enclosing a nuclear core 14. A liquid coolant, such as water or borated water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

An exemplary conventional reactor design is shown in more detail in FIG. 2. In addition to the core 14 comprised of a plurality of parallel, vertical co-extending fuel assemblies 22, for the purpose of this description, the other vessel internal structures can be divided into the lower internals 24 and the upper internals 26. In conventional designs, the lower internals function to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel through one or more inlet nozzles 30, flows down through an annulus between the reactor vessel and the core barrel 32, is turned 180° in a lower plenum 34, passes upwardly to a lower support plate 37 and a lower core plate 36 upon which the fuel assemblies are seated and through and about the fuel assemblies 22. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

Rectilinearly moveable control rods 28 which typically include a drive shaft or drive rod 50 and spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

To control the fission process a number of control rods 28 are reciprocally moveable in guide thimbles located at predetermined positions in the fuel assemblies 22. Specifically, a control rod mechanism positioned above the top nozzle of the fuel assembly supports a plurality of control rods. The control rod mechanism (also known as a rod cluster control assembly) has an internally threaded cylindrical hub member with a plurality of radially extending flukes or arms that form the spider assembly 52 previously noted with regard to FIG. 2. Each arm is interconnected to a control rod 28 such that the control rod assembly mechanism 72 is operable to move the control rods 28 vertically within guide thimbles within the fuel assemblies to thereby control the fission process in the fuel assembly 22, under the motive power of the control rod drive shaft 50 which is coupled to the control rod mechanism hub, all in a well known manner.

Nuclear power plants which employ light water reactors require periodic outages for refueling of the reactor. New fuel assemblies are delivered to the plant and are temporarily stored in a fuel storage building, along with used fuel assemblies which may have been previously removed from the reactor. During a refueling outage, a portion of the fuel assemblies in the reactor are removed from the reactor to the fuel storage building. A second portion of the fuel assemblies are moved from one support location in the reactor to another core support location in the reactor. New fuel assemblies are moved from the fuel storage building into the reactor to replace those fuel assemblies which were removed. These movements are done in accordance with a detailed sequence plan so that each fuel assembly is placed in a specific location in accordance with an overall refueling plan prepared by the reactor core designer. In conventional reactors, the removal of the reactor internal components necessary to access the fuel and the movement of new and old fuel between the reactor and the spent fuel pool in the spent fuel storage building is performed under water to shield the plant maintenance personnel. This is accomplished by raising the water level in a refueling cavity and canal that is integral to the plant's building structure. The water level of more than 20 feet provides shielding for the movement of the reactor internal structures and the fuel assemblies.

Refueling activities are often on a critical path for returning the nuclear plant to power operation, therefore, the speed of these operations is an important economic consideration for the power plant owner. Furthermore, the plant equipment and fuel assemblies are expensive and care must be taken not to cause damage or unnecessary radiation exposure due to improper handling of the fuel assemblies or fuel transfer equipment. The precision of these operations is also important since the safe and economical operation of the reactor core depends upon each fuel assembly being in its proper location. A typical pressurized water reactor needs to be refueled every 18 to 24 months.

Commercial power plants employing the conventional designs illustrated in FIGS. 1 and 2 are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is surrounded by a compact, high pressure containment. Due to both the limited space within the containment and the low cost requirement for integral pressurized light water reactors, the overall number of auxiliary systems needs to be minimized without compromising safety or functionality. For example, the compact, high pressure containment associated with a design of some small modular reactors does not allow for the incorporation of a large floodable cavity above the reactor vessel in which the transferred components can be shielded.

Accordingly, it is an object of this invention to provide special handling equipment to remove the upper internals to permit access to the fuel assemblies, without flooding the containment, while protecting the plant personnel and adjacent equipment from the harmful effects of radiation.

It is a further object of this invention to provide such equipment that can also be employed with conventional reactors that will avoid the necessity and the time and expense of flooding and draining the containment during a refueling operation.

SUMMARY

These and other objects are achieved by an upper internals package lifting fixture for refueling a reactor having a reactor vessel with an upper flange surrounding an opening in the reactor vessel that is sealed by a mating flange on a closure head. The reactor vessel encloses an upper internals package that seats above a plurality of fuel assemblies within a core of the reactor. The upper internals package includes control rod assembly drive rod travel housings in which control rod assembly drive rods are housed and through which the drive rods travel along a vertical path. The upper internal package lifting fixture comprises a shield plate sized to cover the opening in the reactor vessel when supported on the reactor vessel upper flange. The shield plate is formed from a material that lessens the radiation exposure of workers working above the shield plate covering the reactor vessel opening. A lifting rig is formed integral with and extends above the shield plate and means are provided for attaching the shield plate to the upper internals package that can be withdrawn from the reactor by raising the lifting rig.

Preferably, the shield plate of the upper internals package lifting fixture includes openings to access the control rod assembly drive rods and desirably the openings include a tubular penetration through the shield plate that align and mate with the rod travel housings in the upper internals package. In one embodiment, the tubular penetrations respectively include a conical guide that engages the corresponding rod travel housing. Preferably, a number of the tubular penetrations include a drive rod latching tool that is reciprocally moveable within the tubular penetrations and is configured to couple with one or more of the drive rods and disconnect the respective drive rods from a corresponding control rod assembly. Desirably, a retainer is provided that maintains a position of the drive rod latching tool in the tubular penetration. Preferably, the lifting fixture includes a hoist configured to raise and lower the drive rod latching tool wherein the hoist has sufficient power to do so with the drive rod, decoupled from the control rod assembly, attached to the drive rod latching tool and preferably, the hoist is an integral part of the lifting fixture.

In another embodiment, the shield plate includes a ventilation and filtration system configured to draw air from below the shield plate, filter the air so drawn to remove radioactive contaminants and exhaust the drawn air above the shield plate. Furthermore, one embodiment of the upper internals package lifting fixture includes means to engage alignment studs in the upper flange of the vessel to align the shield plate as it is being lowered onto the reactor vessel.

In still another embodiment wherein the rod travel housings extend above the upper flange of the reactor vessel, the shield plate is formed in a top hat configuration to span the reactor vessel opening above the rod travel housings and has a radially outwardly extending brim that is supported on the upper flange of the reactor vessel.

In addition, preferably the upper internals package lifting fixture includes a shielded cylinder having an inner diameter that is larger than an outer diameter of the shield plate, a narrowed opening in an upper end that has a smaller diameter than the outer diameter of the shield plate and a length that is substantially equal to or longer than the upper internals package. Desirably, the shielded cylinder is slidably positioned over the shield plate and the lifting rig has an outer diameter that is smaller than the narrowed opening in the upper end of the shielded cylinder.

This invention further contemplates a method of removing an upper internals package from a nuclear reactor having a reactor vessel with an upper flange surrounding an opening in the reactor vessel that is sealed by a mating flange on a closure head. The reactor vessel encloses the upper internals package that seats above a plurality of fuel assemblies within a core of the reactor. The upper internals package includes a plurality of rod travel housings in which control rod assembly drive rods are housed and through which the drive rods travel along a vertical path. The method comprises the step of removing the closure head from the reactor vessel. The method then lowers a shield plate over the opening in the reactor vessel; the shield plate being sized to cover the opening when supported on the reactor vessel upper flange and formed from a material that lessens the radiation exposure of workers working above the shield plate covering the reactor vessel opening. The shield plate includes an integral lifting rig extending above an upper surface thereof. The method then attaches the shield plate to the upper internals package and raises the shield plate to withdraw the upper internals package out of the reactor.

In one embodiment, the shield plate includes openings to access the control rod assembly drive rods; the access openings including a drive rod latching tool that is reciprocally movable along a substantially vertical travel path through the opening and into the rod travel housings to connect to the drive rods and decouple the drive rods from the corresponding control rod assemblies. The method further includes the steps of attaching the drive rod latching tool at least to one of the drive rods; decoupling the drive rod from the corresponding control rod assembly; and raising the drive rod latching tool to raise the drive rod within the rod travel housing. Preferably, before the step of raising the shield plate, the method includes the step of lowering a shielded cylinder over the shield plate and around the upper internals package. Desirably, the shielded cylinder is supported from the shield plate when the shield cylinder is fully lowered around the upper internals package.

In still another embodiment, the method includes the step of maintaining a negative atmosphere within the shielded cylinder. Preferably, the step of maintaining a negative atmosphere within the shield cylinder comprises venting air from within the shielded cylinder and filtering the vented air before being exhausted outside the shielded cylinder.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
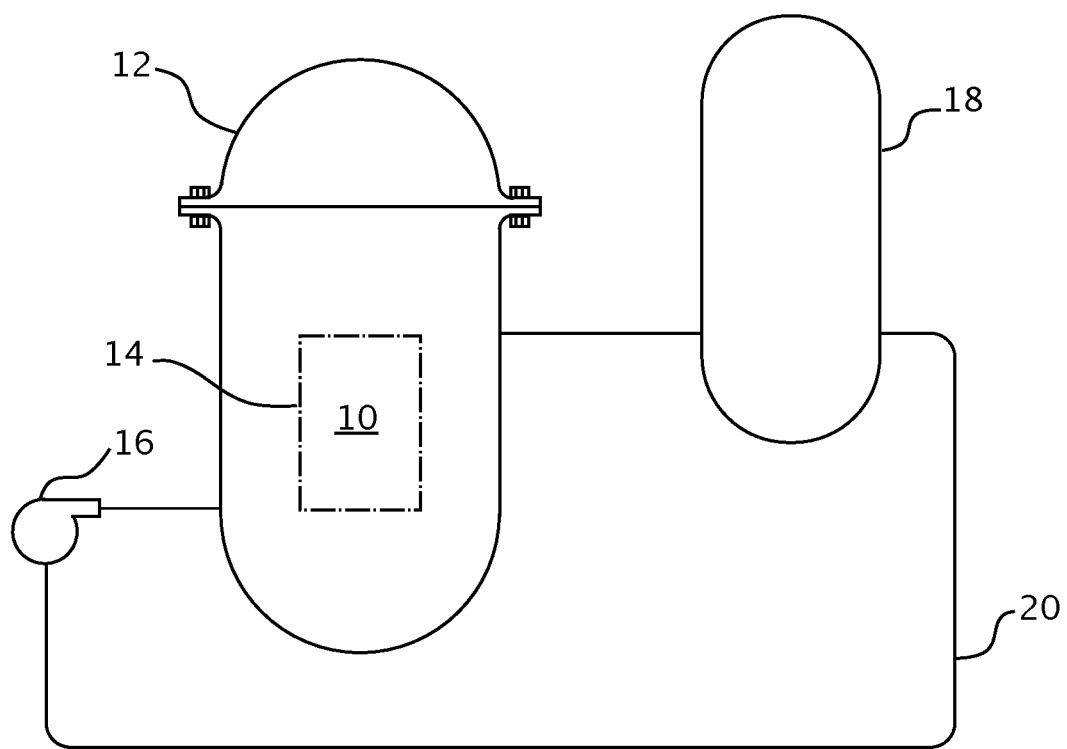
FIG. 1 is a simplified schematic of a conventional nuclear reactor system to which the embodiments described hereafter can be applied.
Figure 2:
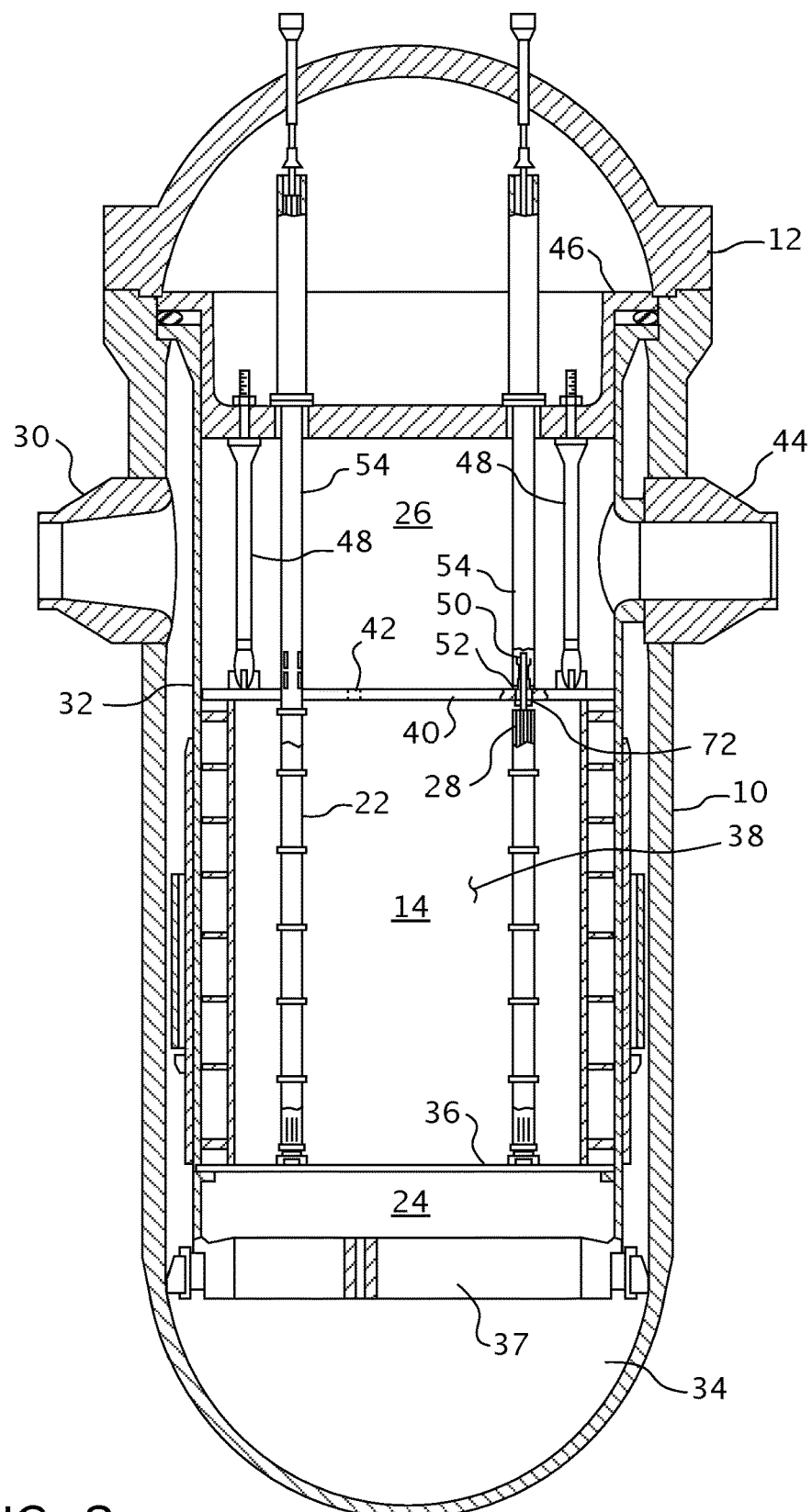
FIG. 2 is an elevational view, partially in section, of a nuclear reactor vessel and internal components to which the embodiments described hereafter can be applied.
Figure 3:
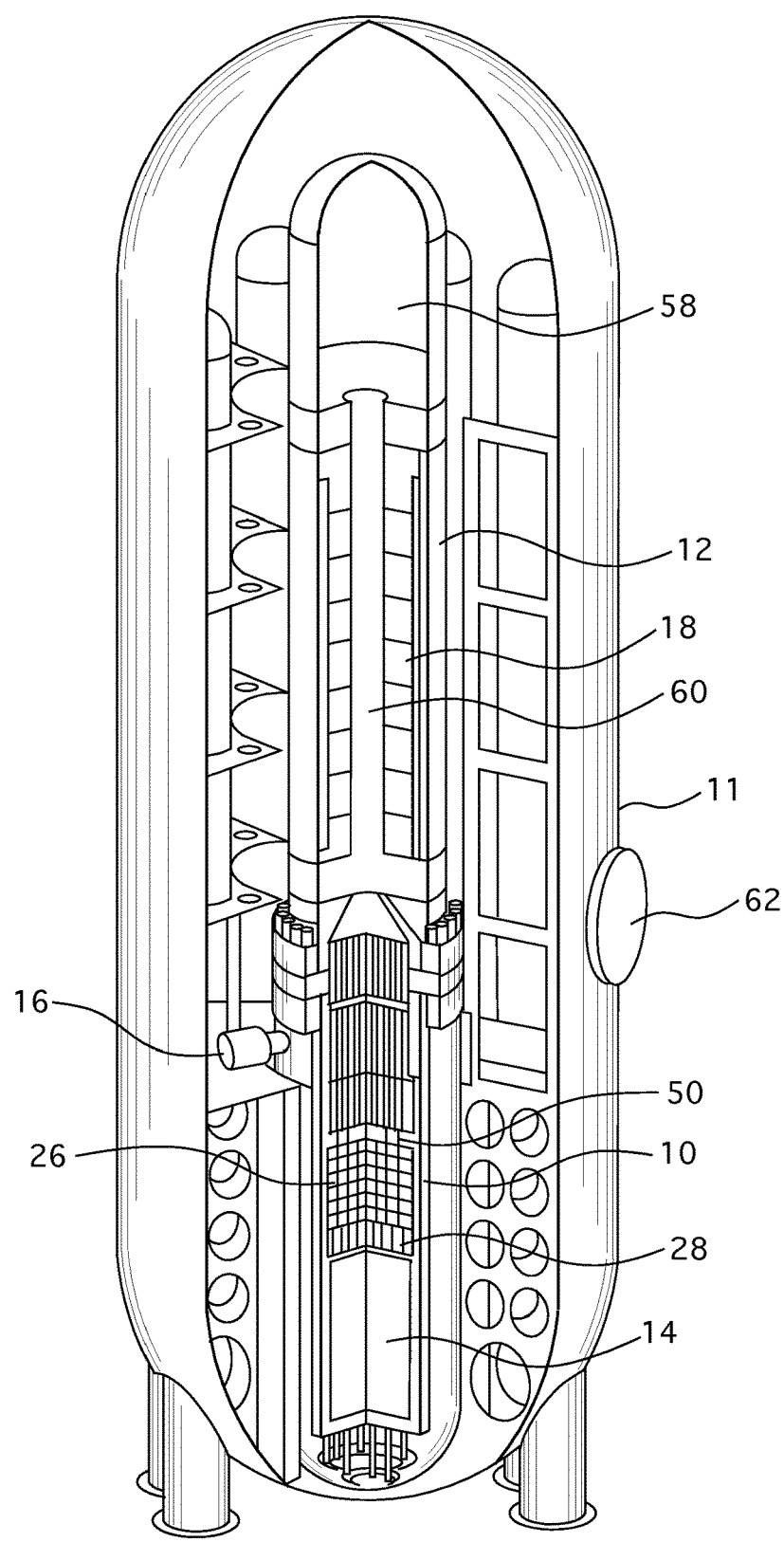
FIG. 3 is a perspective view, partially cut away, showing a small modular reactor system.
Figure 4:
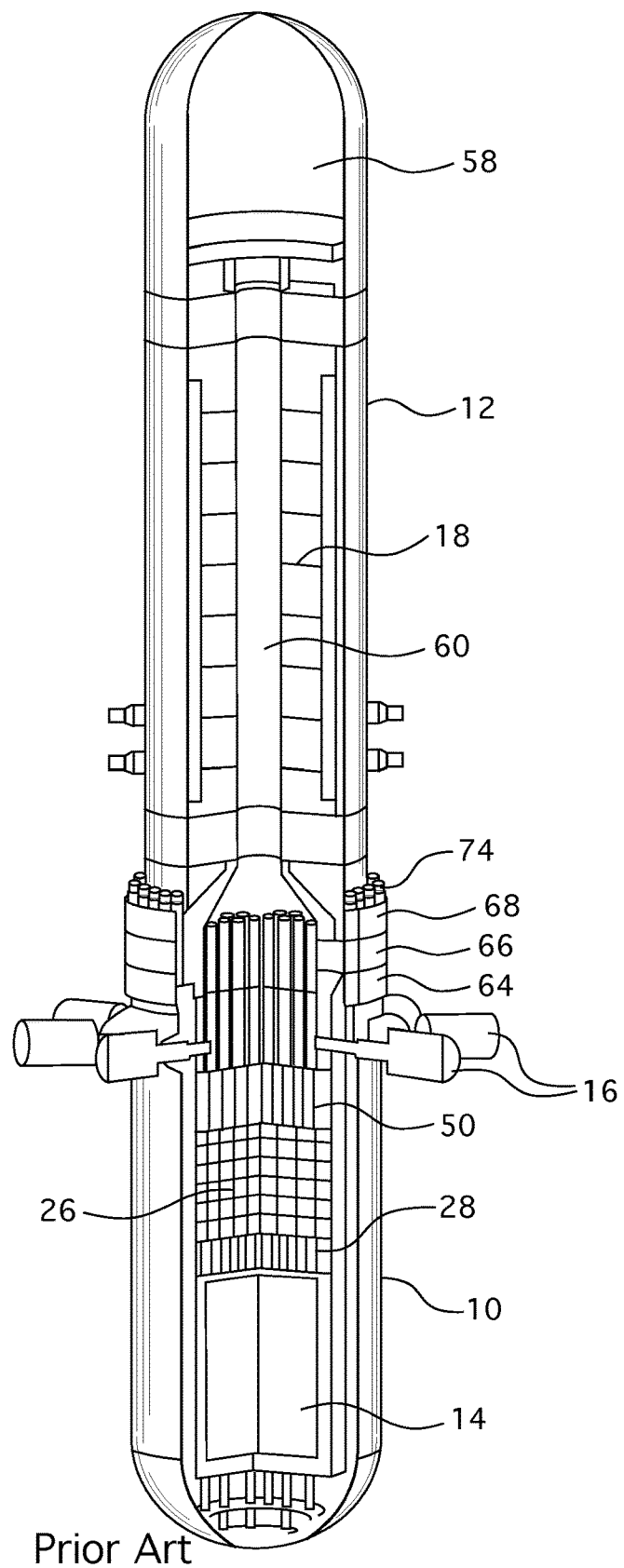
FIG. 4 is an enlarged view of the reactor vessel shown in FIG. 3.

FIGS. 3 and 4 illustrate a small modular reactor design available from the Westinghouse Electric Company LLC, Cranberry Township, Pa., to which this invention may be applied, though it should be appreciated that the invention can also be applied to a conventional pressurized water reactor such as the one illustrated in FIGS. 1 and 2. FIG. 3 shows a perspective view of the reactor containment 11, partially cut away, to show the pressure vessel 10 and its internal components. FIG. 4 is an enlarged view of the pressure vessel shown in FIG. 3. The pressurizer 58 is common to most pressurized water reactor designs, though not shown in FIG. 1, and is typically included in one loop to maintain the system's pressure. In the small modular reactor design illustrated in FIGS. 3 and 4 the pressurizer 58 is integrated into the upper portion of the reactor vessel head 12 and eliminates the need for a separate component. It should be appreciated that the same reference characters are employed for corresponding components among the several figures. A hot leg riser 60 directs primary coolant from the core 14 to a steam generator 18 which surrounds the hot leg riser 60. A number of cooling pumps 16 are circumferentially spaced around the reactor vessel 10 at an elevation near the upper end of the upper internals 26. The reactor coolant pumps 16 are horizontally mounted axial flow canned motor pumps. The reactor core 14 and the upper internals 26, except for their size, are substantially the same as the corresponding components previously described with regard to FIGS. 1 and 2. From the foregoing, it should be appreciated that employing the traditional refueling method by flooding the reactor well above the area of the vessel flange 64 and transferring the fuel assemblies under water to a spent fuel pool by way of a transfer canal 62 that extends through the containment 11 would not be practical with this type of containment and compact design. A further understanding of the operation of the small modular reactor illustrated in FIGS. 3 and 4 can be found in U.S. patent application Ser. No. 13/495,050, filed Jun. 13, 2012, entitled "Pressurized Water Reactor Compact Steam Generator."

Figure 5:
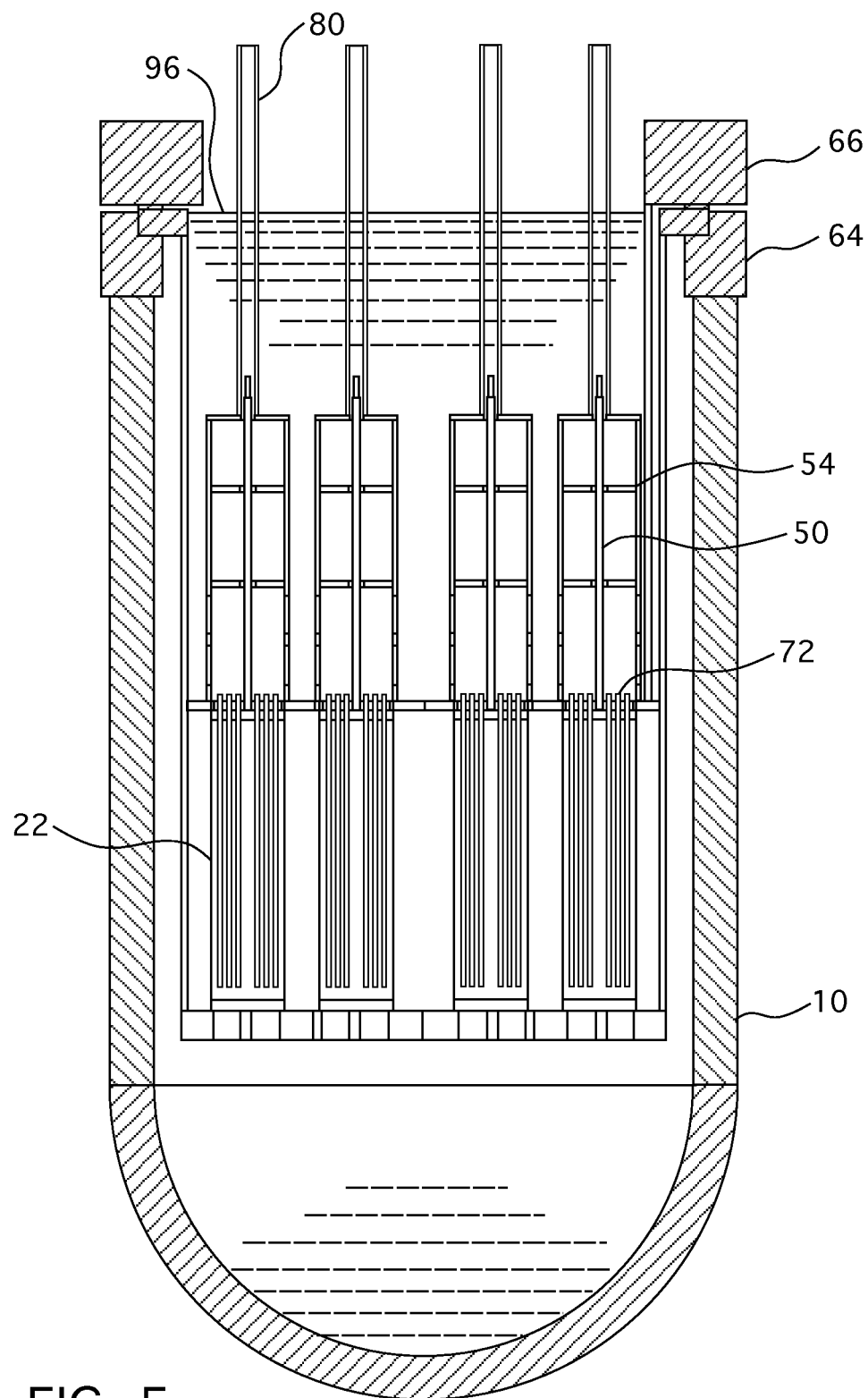
FIG. 5 is a schematic cross sectional view of the reactor vessel shown in FIG. 4 with the steam generator removed and the reactor coolant level lowered to the level of the closure flange.

This invention provides a means of shielding and ventilating the upper internals package 26 as it is removed from the reactor vessel 10 that is integral to the lifting rig used to remove the upper internals package. The invention also provides a means for personnel to decouple the drive rod 50 from the rod cluster control assemblies 72 which is required for refueling pressurized water reactors. However, before the upper internals package can be accessed the reactor head 12 has to be removed and the coolant level 96 within the reactor vessel 10 has to be lowered to the level of the reactor flange 64, as shown in FIG. 5. Once the head is removed and the coolant level is lowered a fixture can be positioned to lift the upper internals package 26 out of the reactor vessel.

One embodiment of the lifting fixture 76 of this invention for this purpose is illustrated in FIGS. 6-11 and includes a thickened shield plate 78 that is placed over the open reactor vessel prior to removing the upper internals. The thickened shield plate provides radiation shielding and access to the control rod drive rods 50 that are reciprocally movable within the rod travel housings 80. Access to the drive rods is provided through aligned openings 82 in the shield plate 78. A means of attaching the shield plate 78 to the upper internals assembly is provided so that the upper internals assembly is lifted with the shield plate. In the embodiment illustrated in FIGS. 6-8, the shield plate 78 is attached to an intermediate penetration flange 66 from which the upper internals are suspended. The intermediate penetration flange 66 is more fully described in co-pending application Ser. No. 13/457,683, filed Apr. 27, 2012, entitled "Instrumentation and Control Penetration Flange for Pressurized Water Reactor."

Tubular penetrations 84 extend through the openings 82 in the shield plate 78 with conical guides 85 that respectively engage one of the rod travel housings 80 of the control rod drive assembly. Though the guides are described as conical, it should be appreciated that they may have a stepped configuration or any of the geometry that will guide the tubular penetrations 84 over the rod travel housings 80. A lifting rig 86 which is integral to the shield plate 78 is designed to lift the upper internals 26 and the drive rod assemblies 50 from the reactor vessel 10 during refueling. A number of drive rod latching tools 88 are provided that are staged in the tubular penetrations 84 of the shield plate 78. A hoist 90 is integral to the lifting rig 86 and is used to raise the drive rod assemblies 50 after they have been decoupled from the rod cluster control assemblies 72, employing the latching tools 88 which are first lowered by the hoist 90 to couple with the upper ends of the drive rods 50. A retaining clip 92 maintains the desired position of the drive rod latching tool 88 in the penetration tube 84. A ventilation system 94 (shown only in FIG. 11) is also integral to the lifting fixture 76 and is configured to maintain filter ventilation of the upper internals as they dry out and reduce the potential for airborne contamination. A means is also provided to engage alignment studs in the vessel to align the upper internals lifting fixture assembly 76 as it is being lowered onto the reactor vessel.

During refueling, the upper internals 26 are removed to gain access to the fuel. Before the internals can be removed, the reactor is depressurized and the reactor closure head or in the case of many small modular reactor designs, the steam generator and pressurizer are removed by removing the bolts 74 that anchor the reactor head flange 68 to the penetration flange 66 and the reactor vessel flange 64. At this point in the refueling of a traditional pressurized water reactor, the refueling cavity is flooded and the drive rods are decoupled from the rod control cluster assemblies and removed from the upper internals.

Small modular reactors with integral pressurized water reactors and compact containments may require that the drive rods are decoupled from the rod cluster control assemblies without the shielding benefit of a flooded refueling cavity. This invention allows for personnel to decouple the drive rods while shielded from the activated components of the reactor internals. Subsequently, the invention allows removal of the upper internals using an integral lifting rig while ensuring that the activated components are shielded during the lift.

FIGS. 5 through 10 illustrate how the invention is used during reactor disassembly. The reverse process is used during reactor assembly.

FIG. 5 shows an integral reactor with the steam generator removed and the reactor coolant water level 96 lowered to the level of the reactor vessel closure flange 64. In this design, the rod travel housings 80 of the control rod drive mechanisms 50 extend above the water level. As shown, the control rod cluster assemblies 72 are completely inserted into the fuel assemblies 22 of the reactor core.

Figure 6:
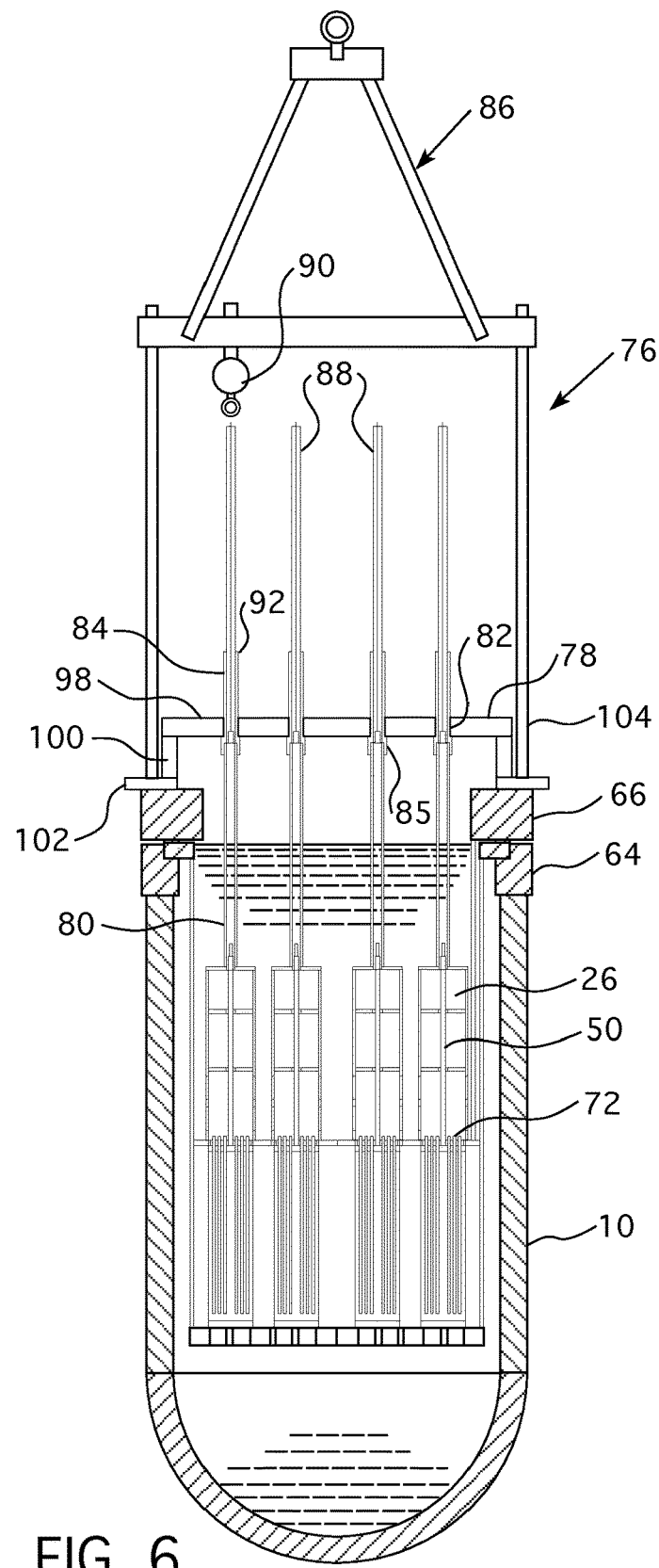
FIG. 6 is a schematic cross sectional view of the reactor vessel shown in FIG. 5 with the lifting rig and shield plate attached as an integral assembly to the penetration flange of the upper internals.

FIG. 6 shows the lifting rig 86 and the shield plate 78 (as an integral assembly) attached to the penetration flange 66 of the upper internals 26. Though the lifting rig 86 and the shield plate 78 are described as an integral unit, it should be appreciated that they may be constructed as separate parts and joined at their interface by any suitable attaching means such as by bolting or welding to form one unit. The shield plate 78 is configured in a top hot design having an upper planar surface 98 that spans the opening in the reactor above the rod travel housings, vertical legs 100 and a radially outwardly extending rim or flange 102 that rests upon and is attached to the penetration flange 66. The top hat design enables the shield plate 78 to accommodate the height of the rod travel housings 80, though it should be appreciated that for reactor internals designs in which the rod travel housings do not extend above the connection point between the shield plate and the upper internals, the shield plate 78 may assume a generally planar configuration rather than the top hat design. The lifting legs 104 on the lifting rig 86 extend through the stud clearance holes in the penetration flange 66 and are secured to the flange with an appropriate fastener such as a threaded collar, a hitch pin or C-shaped clamp. The openings 82 in the shield plate 78 and the tubular penetrations 84 allow access to the drive rod drive shafts for decoupling from the rod cluster control assemblies 72. These same penetrations support the coupling tools 88 within the integral lifting fixture assembly 76 during storage and handling. The shield plate 78, tubular penetrations 84 and decoupling tools 88 provide the desired shielding required for plant personnel to work while standing on the shield plate.

Figure 7:
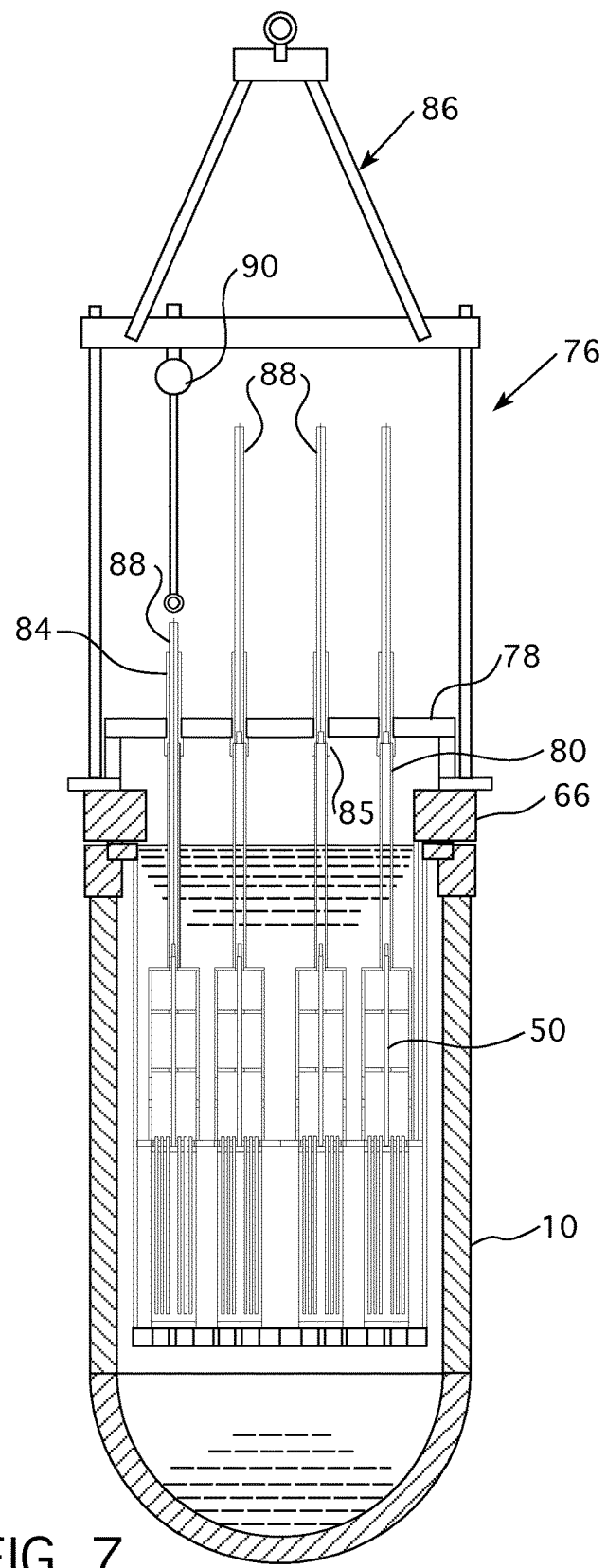
FIG. 7 is the schematic reactor cross sectional view shown in FIG. 6 with the decoupling tool of this invention lowered until it engages a control rod.
Figure 8:
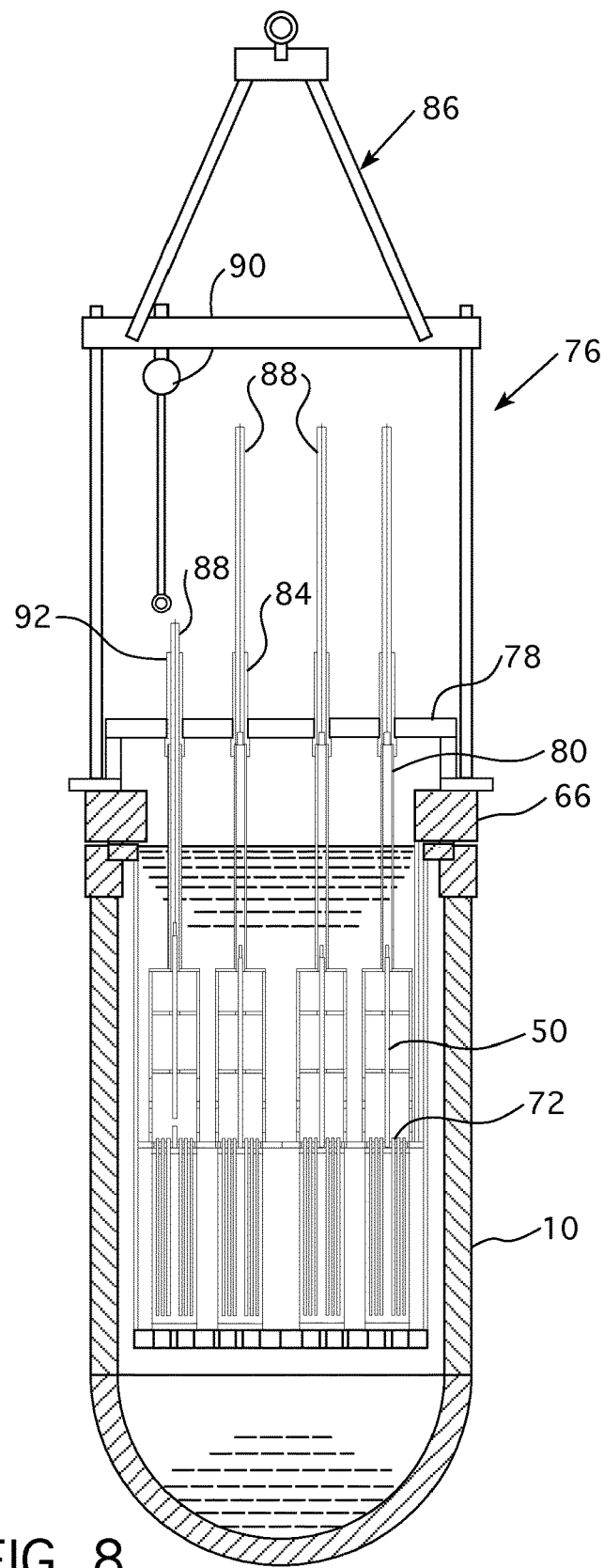
FIG. 8 is the schematic reactor cross sectional view shown in FIG. 7 showing the decoupling tool decoupling the drive rod from a rod cluster control assembly in accordance with one embodiment described hereafter.

FIG. 7 shows the decoupling tool 88 lowered until it engages the drive rod 50. FIG. 8 shows where the decoupling tool 88 decouples the drive rod 50 from the rod cluster control assembly 72 using methods that have already been deployed in the operating fleet of pressurized water reactors. Once decoupled from the rod cluster control assembly 72 the drive rod 50 is raised using the hoist 90 and secured to the tubular penetration 84 supporting the decoupling tool with the retaining clip 92. The drive rod 50 will remain secure in this position through the remainder of the refueling activities. The rod cluster control assembly remains in the fuel assembly and is moved with the fuel.

Figure 9:
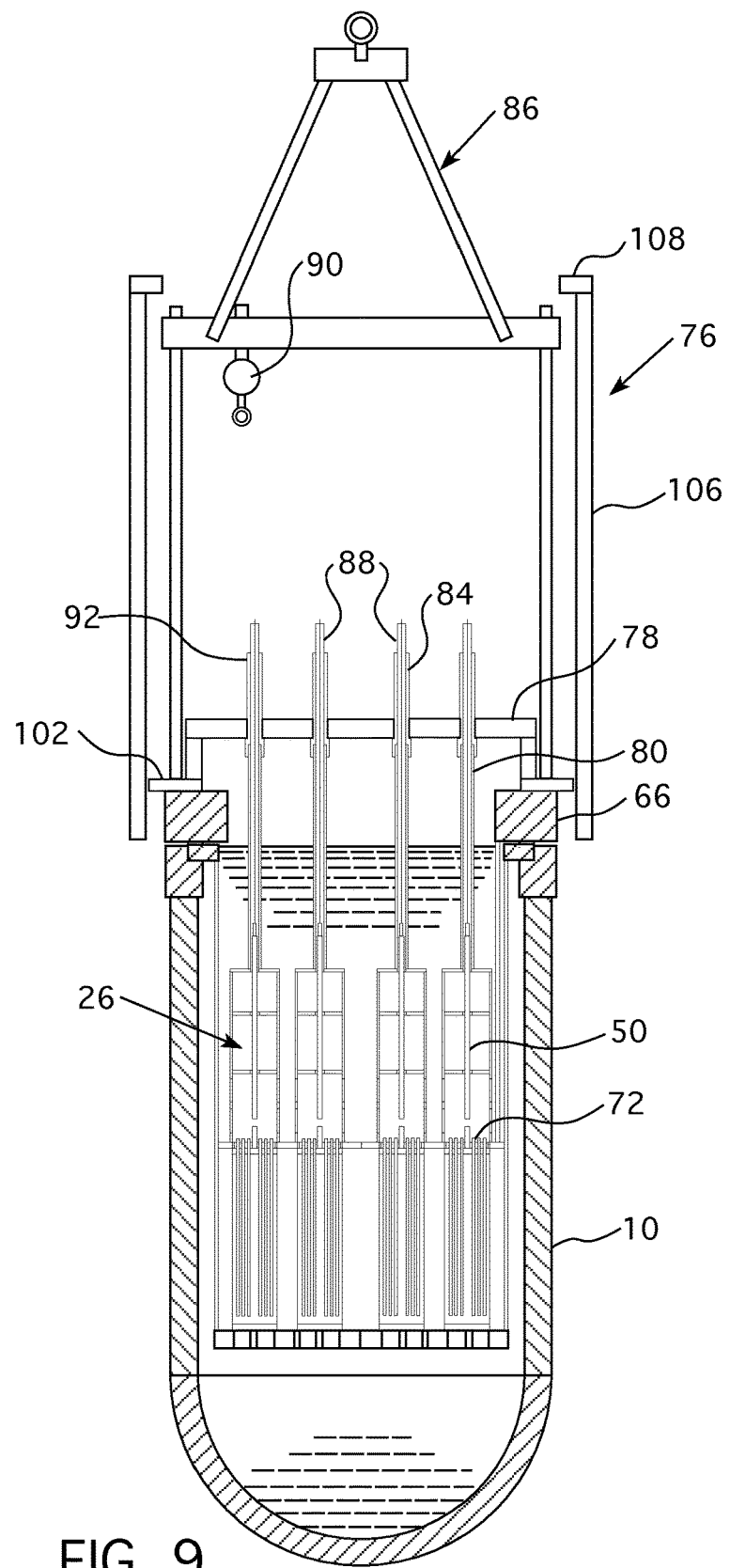
FIG. 9 is the reactor cross sectional view shown in FIG. 8 with a shielded cylinder being lowered over the integral shield plate lifting rig assembly.
Figure 10:
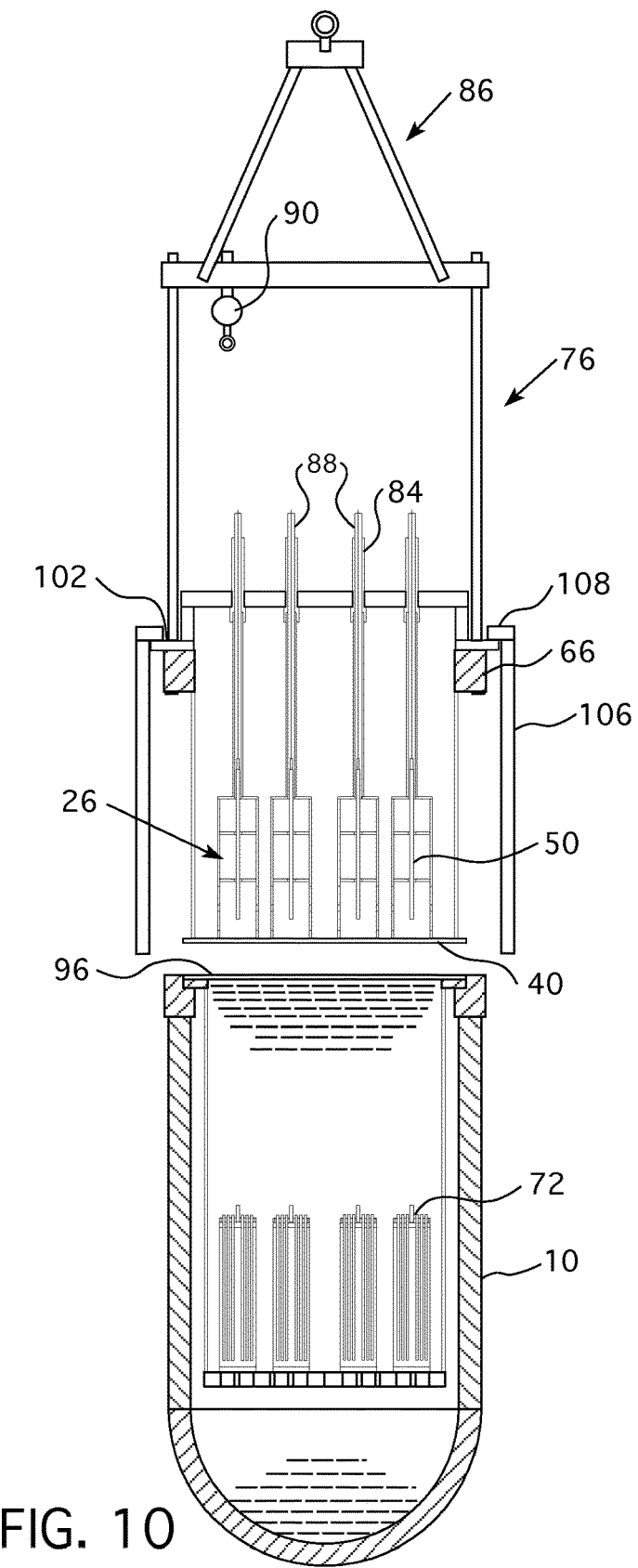
FIG. 10 is the schematic reactor cross sectional view shown in FIG. 9 with the internals package being lifted from the reactor vessel.
Figure 11:
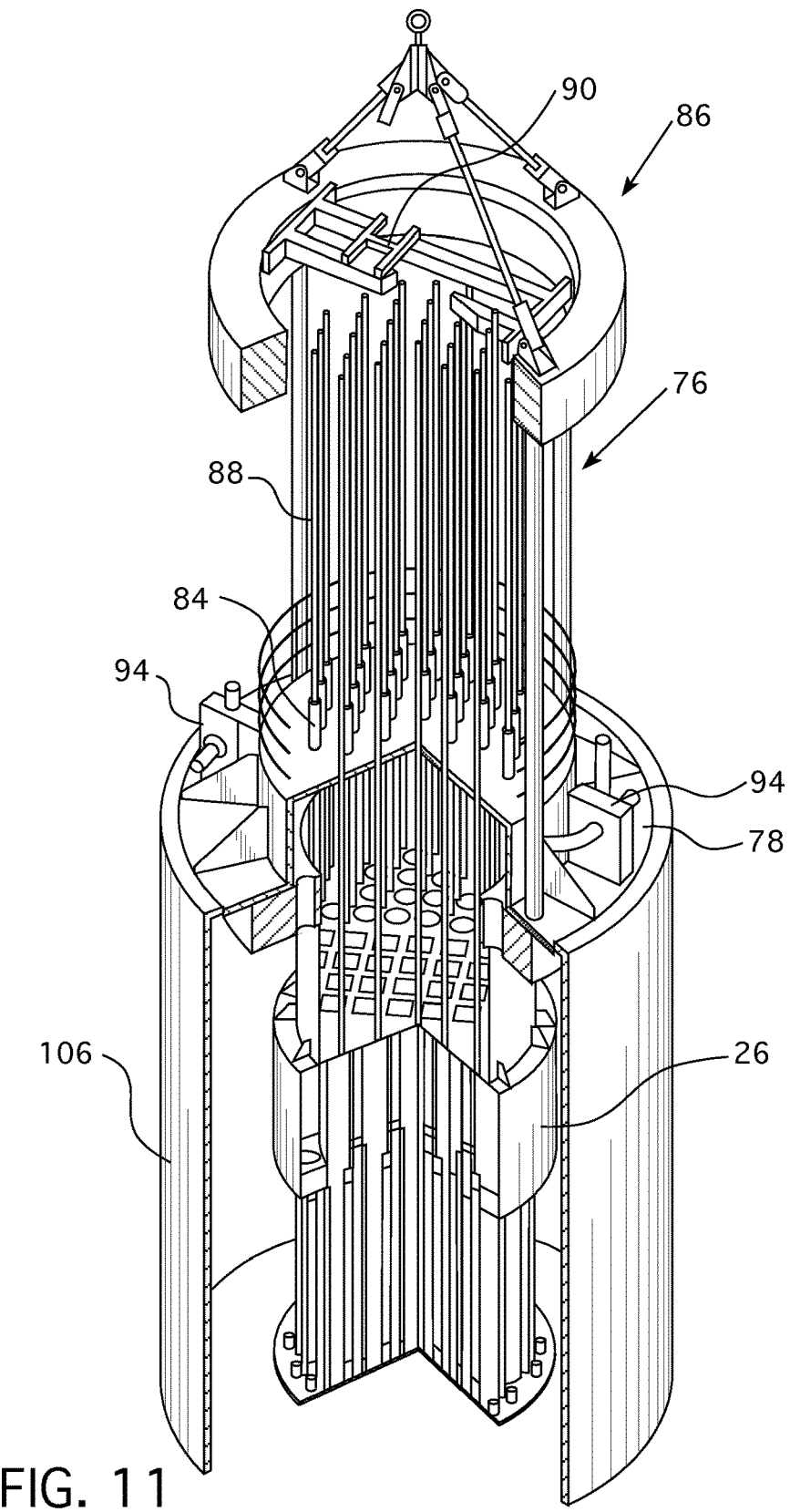
FIG. 11 is a perspective view, partially in section, showing the complete upper internals package lifting fixture of this invention with the reactor upper internals engaged.

A shielded cylinder 106 is then lowered over the integral shield plate lifting rig assembly 76 (shown in FIG. 9). This shielded cylinder may be supported by the structures within the containment building that support the reactor itself or it may be supported by its inwardly extending upper flange 108 resting on the shield plate flange 102. The design of the shield cylinder 106 is such that it fits entirely around the upper internals assembly 26 and the integral lifting rig 86 and has a sufficient length to completely cover the length of the upper internals 26 when the shielded cylinder's inwardly extending upward flange 108 is resting upon the shield plate flange 102 as shown in FIG. 10. A narrowed opening at the top of the shielded cylinder 106 formed from the inwardly extending flange 108 allows both the upper internals and the shielded cylinder to be lifted from the reactor vessel when the shielded plate flange 102 engages the shielded cylinder flange 108 as shown in FIG. 10. After the lifting fixture 76 engages the shielded cylinder 106 and the upper internals 26 has cleared the reactor vessel, the entire assembly is moved to its refueling storage location. While the upper internals 26 are being raised, the activated structures of the internals will break the water surface 96 and the potential for the creation of airborne radioactive contaminants exists as the components begin to dry out. The integral ventilation and filtration system 94 ensure that any airborne contaminants are kept within the shielded cylinder by maintaining a negative atmosphere (i.e., the pressure within the shielded cylinder 106 is below the pressure outside the shielded cylinder) or are captured in the filtration system. FIG. 11 provides a three-dimensional perspective of the upper internals 26 captured within the shielded cylinder 106 and supported by the shielded plate 78.

While this invention was described as applied to a small modular reactor design, it should be appreciated that it can also be used in the refueling of conventional pressurized water reactors as well as other compatible reactor designs. Dry refueling of conventional reactor designs or reducing the extent of flooding that may be required during refueling will save time and expense on the critical path of conventional plant refueling outages.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of removing an upper internals package from a nuclear reactor having a reactor vessel with an upper flange surrounding an opening in the reactor vessel that is sealed by a mating flange on a closure head, the reactor vessel enclosing the upper internals package that seats above a plurality of fuel assemblies within a core of the reactor, the upper internals package including a plurality of rod travel housings in which control rod assembly drive rods are housed and through which the drive rods travel along a vertical path, the method comprising the steps of:

removing the closure head from the reactor vessel;
   lowering a shield plate over the opening in the reactor vessel after removing the closure head from the reactor vessel, the shield plate being sized to cover the opening when supported on the reactor vessel upper flange and being formed from a material that lessens the radiation exposure of workers working above the shield plate covering the reactor vessel opening, with openings through the shield plate in-line with the rod travel housings through which the control rod assembly drive rods can be accessed, the shield plate including an integral lifting rig extending above an upper surface thereof;
   attaching the shield plate to the upper internals package;
   accessing the control rod assembly drive rods through the openings; and
   raising the shield plate to withdraw the upper internals package out of the reactor.

2. The method of claim 1 wherein the access openings include a drive rod latching tool that is reciprocally moveable along a substantially vertical travel path through the opening and into the rod travel housings to connect to the drive rods and decouple the drive rods from the corresponding control rod assemblies, including the steps of:

attaching the drive rod latching tool to at least one of the drive rods;
   decoupling the drive rod from the corresponding control rod assembly; and
   raising the drive rod latching tool to raise the drive rod within the rod travel housing.

3. The method of claim 2 including the step of latching the drive rod in a raised position within the rod travel housing after the raising step.

4. The method of claim 2 wherein before the step of raising the shield plate the method comprises the step of lowering a shield cylinder over the shield plate and around the upper internals package.

5. The method of claim 4 including the step of supporting the shield cylinder from the shield plate when the shield cylinder is fully lowered around the upper internals package.

6. The method of claim 4 including the step of maintaining a negative atmosphere within the shield cylinder.

7. The method of claim 6 wherein the step of maintaining a negative atmosphere within the shield cylinder comprises venting air within the shield cylinder and filtering the vented air before being exhausted outside the shield cylinder.

* * * * *